United States Patent
Yamasaki

(10) Patent No.: US 11,201,685 B2
(45) Date of Patent: Dec. 14, 2021

(54) IN-VEHICLE NETWORK SYSTEM

(71) Applicant: TOYOTA JIDOSHA KABUSHIKI KAISHA, Toyota (JP)

(72) Inventor: Yasuhiro Yamasaki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/775,576

(22) Filed: Jan. 29, 2020

(65) Prior Publication Data

US 2020/0259579 A1 Aug. 13, 2020

(30) Foreign Application Priority Data

Feb. 12, 2019 (JP) .............................. JP2019-022483

(51) Int. Cl.
| | | |
|---|---|---|
| H04J 3/06 | (2006.01) | |
| H04L 12/26 | (2006.01) | |
| H04L 12/863 | (2013.01) | |
| H04L 29/08 | (2006.01) | |

(52) U.S. Cl.
CPC .......... *H04J 3/0673* (2013.01); *H04J 3/0667* (2013.01); *H04J 3/0682* (2013.01); *H04L 43/0864* (2013.01); *H04L 47/627* (2013.01); *H04L 67/12* (2013.01)

(58) Field of Classification Search
CPC ... H04L 43/0864; H04L 47/627; H04L 67/12; H04L 12/40143; H04L 2012/40273; H04J 3/0667; H04J 3/0673; H04J 3/0682
See application file for complete search history.

(56) References Cited

U.S. PATENT DOCUMENTS

| | | | |
|---|---|---|---|
| 8,180,875 B1* | 5/2012 | Dave' .................... | H04J 3/0664 709/223 |
| 2004/0081079 A1* | 4/2004 | Forest ................... | H03M 13/43 370/216 |
| 2005/0207387 A1* | 9/2005 | Middleton ............ | H04J 3/0682 370/347 |

(Continued)

OTHER PUBLICATIONS

Correll, K. et al. "Design Considerations for Software Only Implementations of the IEEE 1588 Precision Time Protocol", In Conference on IEEE 1588 Standard for a Precision Clock Synchronization Protocol for Networked Measurement and Control Systems, 6 pages.

(Continued)

*Primary Examiner* — Rina C Pancholi

(74) *Attorney, Agent, or Firm* — Oblon, McClelland, Maier & Neustadt, L.L.P.

(57) ABSTRACT

An in-vehicle network system includes first device and second device configured to send or receive to or from each other, and an intermediate node connected between the first device and the second device, the intermediate node being configured to output buffered messages in a sequence determined by a relative priority scheme. The first device includes a control unit configured to measure a communication delay for each of a plurality of different priority messages, set a delay representative value less than a maximum value of the plurality of communication delays, and adjust time that a time management unit manages, based on time that the first device manages, time that the second device manages, and the delay representative value.

8 Claims, 4 Drawing Sheets

(56) References Cited

U.S. PATENT DOCUMENTS

| | | | |
|---|---|---|---|
| 2007/0213888 A1* | 9/2007 | Shidai | H04J 3/0682 |
| | | | 701/1 |
| 2009/0225790 A1* | 9/2009 | Shay | H04J 3/0664 |
| | | | 370/503 |
| 2011/0160951 A1* | 6/2011 | Ishigooka | G07C 3/02 |
| | | | 701/31.4 |
| 2011/0208884 A1* | 8/2011 | Horihata | H04L 12/40143 |
| | | | 710/105 |
| 2011/0274053 A1* | 11/2011 | Baik | H04W 72/1242 |
| | | | 370/329 |
| 2012/0278507 A1* | 11/2012 | Menon | H04L 12/40 |
| | | | 709/248 |
| 2015/0003443 A1* | 1/2015 | Koenigseder | H04L 12/4625 |
| | | | 370/350 |
| 2016/0173395 A1* | 6/2016 | Danielsson | H04L 47/28 |
| | | | 370/236 |
| 2021/0067311 A1* | 3/2021 | Park | H04L 12/40013 |
| 2021/0089040 A1* | 3/2021 | Ebrahimi Afrouzi | |
| | | | G05D 1/0246 |

OTHER PUBLICATIONS

Scheiterer, R. et al. "Synchronization Performance of the Precision Time Protocol in Industrial Automation Networks" IEEE Transactions on Instrumentation and Measurement, vol. 58, No. 6, Jun. 2009, pp. 1849-1857.

* cited by examiner

IN-VEHICLE NETWORK SYSTEM

INCORPORATION BY REFERENCE

The disclosure of Japanese Patent Application No. 2019-022483 filed on Feb. 12, 2019 including the specification, drawings and abstract is incorporated herein by reference in its entirety.

BACKGROUND

1. Technical Field

The disclosure relates to a network system provided in a vehicle, or the like.

2. Description of Related Art

A network system is provided in a vehicle. In the network system, a plurality of devices called electronic control unit (ECU) is connected. Each ECU sends or receives messages to or from each other and executes a share of functions of the vehicle. A network system generally includes intermediate nodes to relay or transfer messages, such as a switch, a router, or a gateway, and each ECU transmits or receives messages to or from each other via the intermediate node.

In such a network system, a method of synchronizing time that each device manages has been suggested. Kendall Correll, Nick Barendt, and Michael Branicky. "Design Considerations for Software Only Implementations of the IEEE1588 Precision Time Protocol." In Conference on IEEE1588 Standard for a Precision Clock Synchronization Protocol for Networked Measurement and Control Systems have studied a method of implementing a time synchronization method in compliance with IEEE1588 standard that defines such a technique.

SUMMARY

In such a method of synchronizing time, a device that serves as a slave sends or receives messages to or from a device that serves as a master to execute a delay measurement process and an offset measurement process. In the delay measurement process, the slave measures a communication delay between the master and the slave. In the offset measurement process, the slave receives a message from the master, finds a difference between time at which the slave has received the message and time at which the master has sent the message, and finds an offset that is the amount of advance of time of the slave from time of the master by subtracting the communication delay measured in the delay measurement process from the difference. To execute time synchronization with high accuracy, high offset measurement accuracy is necessary. Therefore, a difference between communication delays of messages, which are sent from the master to the slave, in the delay measurement process and the offset measurement process are required to be small as much as possible.

An intermediate node, such as a switch, stores a message in a buffer upon reception of the message from a device and determines a sequence in which a plurality of messages is output to destination devices based on a priority contained in each message. The intermediate node clears a message from the buffer once the intermediate node outputs the message. Schemes of determining such an output sequence include an absolute priority scheme and a relative priority scheme. The absolute priority scheme guarantees that, of messages stored in a buffer, a higher priority message is always sent earlier than a lower priority message. The relative priority scheme, such as WRR and WFQ, has no such guarantee.

As a message that is used in a process for time synchronization, generally, a single priority message is used. When the highest priority message is used as such a message, it is expected that a communication delay is minimum and stable and high-accuracy time synchronization is possible because of a small distribution of communication delay. However, when an intermediate node uses a relative priority scheme, it may actually not go as expected depending on the number or distribution, for each priority, of messages that are input to the intermediate node, and a communication delay or a distribution of communication delay may not be minimized because the highest priority message is not always sent first. For this reason, even when the highest priority message is used, offset measurement accuracy can be low, and the accuracy of time synchronization can also be low.

The disclosure provides a network system that is provided in a vehicle and that is able to improve the accuracy of time synchronization between devices even via an intermediate node of a relative priority scheme.

An in-vehicle network system according to an aspect of the disclosure includes a first device configured to manage time; a second device configured to manage time and send or receive a message to or from the first device; and an intermediate node connected between the first device and the second device, the intermediate node being configured to buffer input messages, the intermediate node being configured to output the buffered messages in a sequence determined by a relative priority scheme, the relative priority scheme being a scheme that does not guarantee that a first message whose priority is higher than a priority of a second message is always output earlier than the second message, and the first message and the second message being included in the buffered messages. The first device includes a communication unit configured to communicate with the second device, a time management unit configured to manage the time, and a control unit configured to measure a communication delay for each of a plurality of different priority messages by controlling the communication unit to send or receive the plurality of messages to or from the second device, set a delay representative value less than a maximum value of the plurality of the communication delays based on a result of measuring the communication delays, acquire the time managed by the second device at which the second device has sent a message, and adjust the time managed by the time management unit manages based on the time managed by the first device at which the first device has received the message, the time managed by the second device at which the second device has sent the messages, and the delay representative value.

According to the disclosure, a network system that is provided in a vehicle and that is able to improve the accuracy of time synchronization between devices even via an intermediate node of a relative priority scheme can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

In a network system according to the disclosure, an intermediate node like a switching hub is provided, and the intermediate node uses a relative priority scheme. In the network system, a distribution of communication delay of the highest priority message can be not the smallest of distributions of communication delays of all the priorities. However, a device included in the network system sets a communication delay representative value whose distribution is expected to be relatively small through communication using multiple priority messages and finds an offset that is a time adjustment amount for synchronization by using the communication delay representative value, so the accuracy of time synchronization is improved.

Embodiment

Hereinafter, an embodiment of the disclosure will be described in detail with reference to the accompanying drawings.

Configuration

Figure 1:
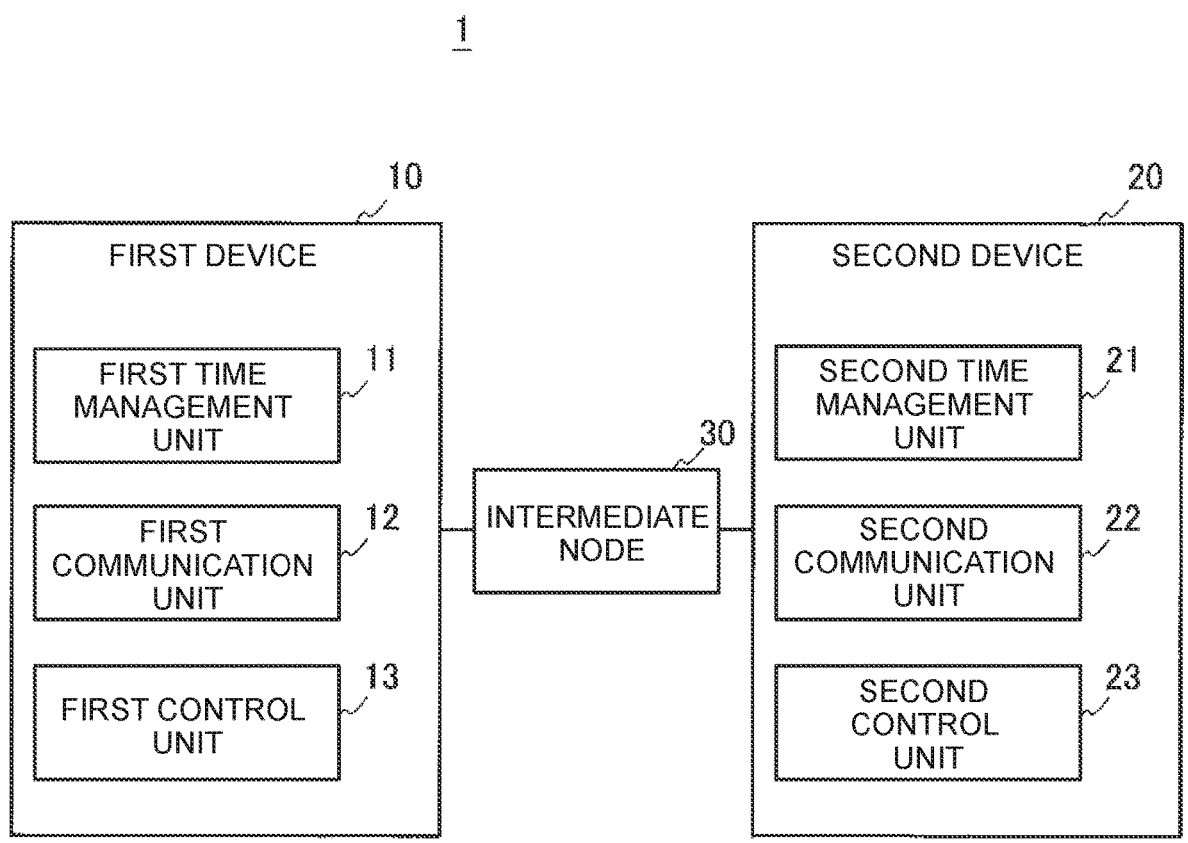
FIG. 1 is a configuration diagram of a network system according to an embodiment of the disclosure.

FIG. 1 shows part of the configuration of a network system 1 according to the present embodiment. The network system 1 is provided in a vehicle as an example. The network system 1 includes a first device 10, a second device 20, and an intermediate node 30. The first device 10 and the second device 20 each are, for example; an ECU. The intermediate node 30 is, for example, a switching hub. The first device 10 and the second device 20 are connected via the intermediate node 30 so as to be able to send or receive messages to or from each other. The network system 1 may include another ECU. The network system 1 performs, for example, communication compliant with Ethernet (registered trademark) standard.

The first device 10 includes a first time management unit (time management unit) 11, a first communication unit (communication unit) 12, and a first control unit (control unit) 13. The first time management unit 11 has a unique clock function and manages time. The first communication unit 12 communicates with other devices including the second device 20 in the network system 1. The first control unit 13 controls the first time management unit 11 and the first communication unit 12. Similarly, the second device 20 includes a second time management unit 21, a second communication unit 22, and a second control unit 23. The second time management unit 21 has a unique clock function and manages time. The second communication unit 22 communicates with other devices including the first device 10 in the network system 1. The second control unit 23 controls the second time management unit 21 and the second communication unit 22.

A message sent by the first device 10, the second device 20, or another device, is input to the intermediate node 30. The intermediate node 30 stores a message in an internal buffer upon receiving the message. The intermediate node 30 determines (schedules) a sequence to output a message to a device that is a destination of the message for each of a plurality of messages stored in a buffer based on a priority included in each message, and outputs the messages in the determined sequence. The intermediate node 30 clears a message from the buffer once the intermediate node 30 outputs the message, and maintains a state where only the messages that have not output are stored in the buffer.

The intermediate node 30 according to the present embodiment uses a relative priority scheme like a weighted round robin (WRR) scheme as an example in determining a sequence in which messages are output. The intermediate node 30 frequently sends a higher priority message earlier than a lower priority message of messages stored in the buffer; however, there is no guarantee to always send a higher priority message first. In other words, a communication delay that is a time required from when a message is sent from a source device to when the message is received by a destination device via the intermediate node 30 in the case where the priority of a message is high can be longer than a communication delay in the case where the priority of a message is low depending on the number or distribution, for each priority, of certain priority messages to be input to the intermediate node 30. In other words, it is expected that a communication delay and its distribution of a higher priority message generally tends to be smaller than those of a lower priority message; however, the relationship is not always like this. It is presumable that, regardless of priority, a certain priority message whose communication delay is short at a point in time is more stable and has a smaller distribution at that point in time than another certain priority message whose communication delay is long at that point in time.

Process

Figure 2:
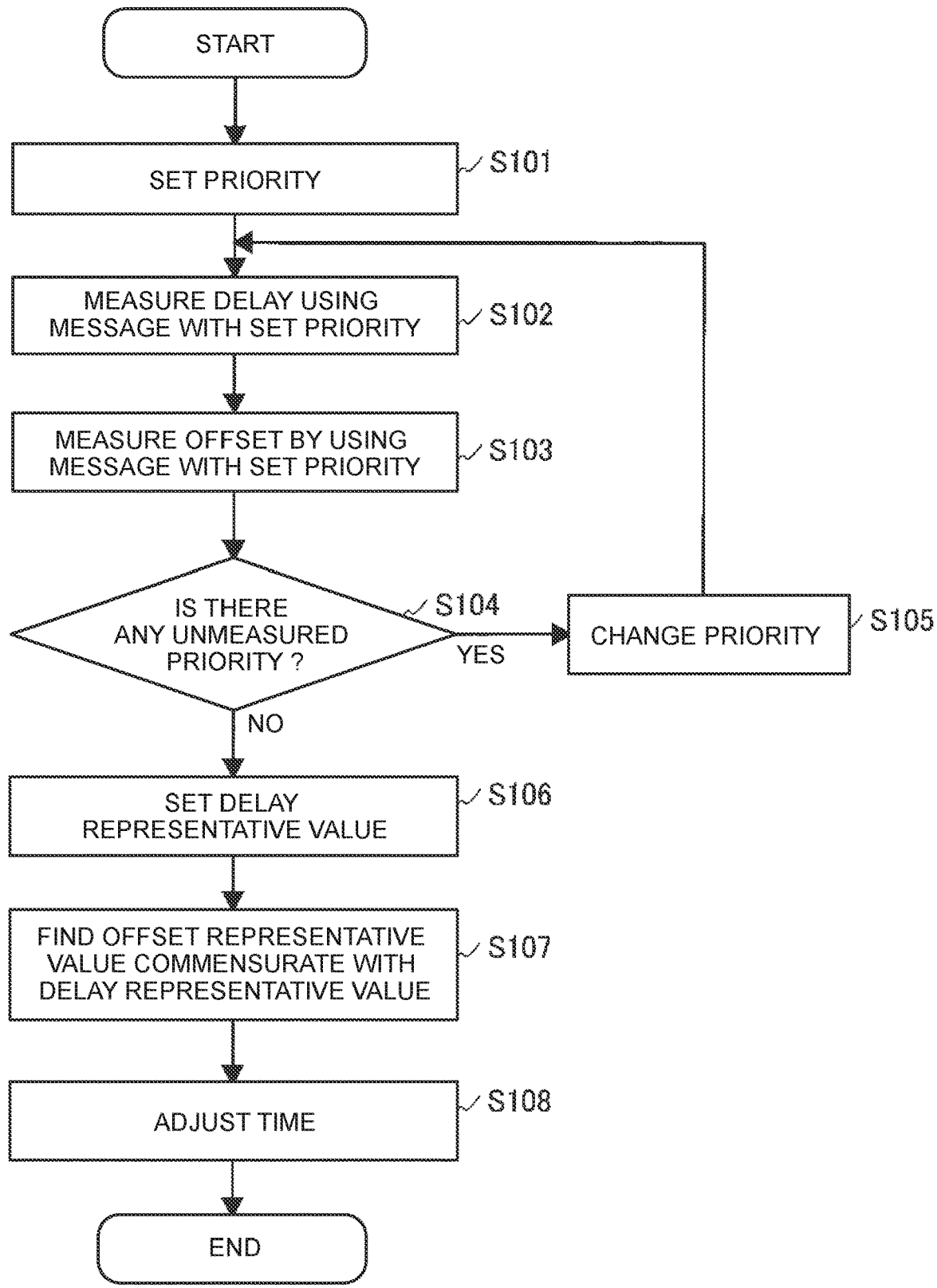
FIG. 2 is a flowchart that shows a process according to the embodiment of the disclosure.

Hereinafter, a time synchronization process according to the present embodiment will be described. The process can be executed, for example, periodically, or at startup of the network system 1, or when the functional time of each device is required to match each other. Here, as an example, a process in which the first device 10 synchronizes time that the host device manages with time that the second device 20 manages will be described. FIG. 2 is a flowchart of the process that the first device 10 executes.

Step S101

The first control unit 13 of the first device 10 sets the priority of a message that is used in the time synchronization process. A plurality of values is defined as priorities in the standard of communication. The priorities have, for example, eight levels from the highest "7" to the lowest "0". Of these, two or more levels of priorities are assumed as levels that are used in the present embodiment. In this step, of two or more levels of priorities, which are set to be used in the present embodiment, any one of the priorities is set.

Step S102

Figure 3:
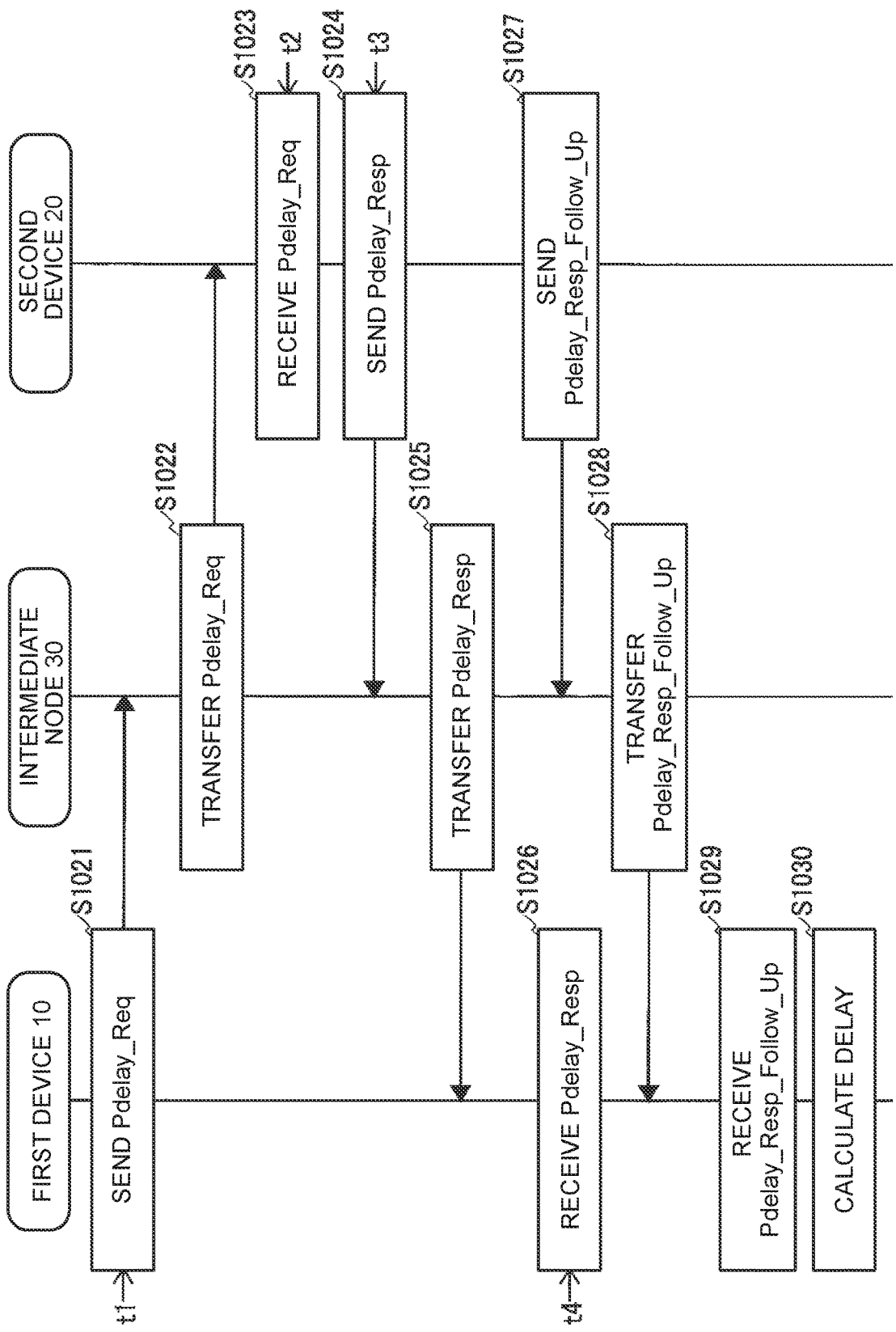
FIG. 3 is a sequence diagram that shows a process according to the embodiment of the disclosure.

The first control unit 13 of the first device 10 measures a communication delay between the first device 10 and the second device 20 by using communication through a message with the priority set in step S101. The details of this step will be described with reference to FIG. 3. FIG. 3 is a sequence diagram that illustrates the process of step S102 in detail. The process of step S102 is executed in compliance with IEEE1588 standard as an example.

Step S1021

The first control unit 13 of the first device 10 generates a Pdelay_Req message with the priority set in step S101. The first communication unit 12 of the first device 10 sends the Pdelay_Req message to the second device 20. The first control unit 13 stores time t1 at which the Pdelay_Req message has been sent, by referencing time that the first time management unit 11 manages.

Step S1022

The Pdelay_Req message is input to the intermediate node 30. The intermediate node 30 schedules the output timing of the Pdelay_Req message based on the priority contained in the Pdelay_Req message and transfers the Pdelay_Req message to the second device 20 by outputting the Pdelay_Req message in accordance with the scheduled output timing.

Step S1023

The second communication unit 22 of the second device 20 receives the Pdelay_Req message. The second control unit 23 of the second device 20 stores time t2 at which the second device 20 has received the Pdelay_Req message, by referencing time that the second time management unit 21 manages.

Step S1024

The second control unit 23 of the second device 20 generates a delay_Resp message with the same priority as the priority contained in the received Pdelay_Req message. The second communication unit 22 of the second device 20 sends the Pdelay_Resp message to the first device 10. The Pdelay_Resp message contains the time t2 at which the second device 20 has received the Pdelay_Req message.

Step S1025

The Pdelay_Resp message is input to the intermediate node 30. The intermediate node 30 schedules the output timing of the Pdelay_Resp message based on the priority contained in the Pdelay_Resp message and transfers the Pdelay_Resp message to the first device 10 by outputting the Pdelay_Resp message in accordance with the scheduled output timing.

Step S1026

The first communication unit 12 of the first device 10 receives the Pdelay_Resp message. The first control unit 13 of the first device 10 stores the time t2 contained in the Pdelay_Resp message and also stores time t4 at which the Pdelay_Resp message has been received, by referencing time that the first time management unit 11 manages.

Step S1027

The second control unit 23 of the second device 20 acquires time t3 at which the second device 20 has sent the Pdelay_Resp message in step S1024, by referencing time that the second time management unit 21 manages. The second control unit 23 generates a Pdelay_Resp_Follow_Up message. The second communication unit 22 of the second device 20 sends the Pdelay_Resp_Follow_Up message to the first device 10. The Pdelay_Resp_Follow_Up message contains the time t3 at which the second device 20 has sent the Pdelay_Resp message.

Step S1028

The Pdelay_Resp_Follow_Up message is input to the intermediate node 30. The intermediate node 30 schedules the output timing of the Pdelay_Resp_Follow_Up message based on the priority contained in the Pdelay_Resp_Follow_Up message and transfers the Pdelay_Resp_Follow_Up message to the first device 10 by outputting the Pdelay_Resp_Follow_Up message in accordance with the scheduled output timing.

Step S1029

The first communication unit 12 of the first device 10 receives the Pdelay_Resp_Follow_Up message. The first control unit 13 stores the time t3 contained in the Pdelay_Resp_Follow_Up message.

Step S1030

The first control unit 13 of the first device 10 calculates a communication delay "delay" by using the following mathematical expression (1) based on the time t1, the time t2, the time t3, and the time t4. The communication delay "delay" is a time that is taken from when a message is transmitted from the second device 20 to when the message is received by the first device 10 via the intermediate node 30.

$$\text{delay} = \{(t4-t1) - (t3-t2)\}/2 \quad (1)$$

Step S103

Figure 4:
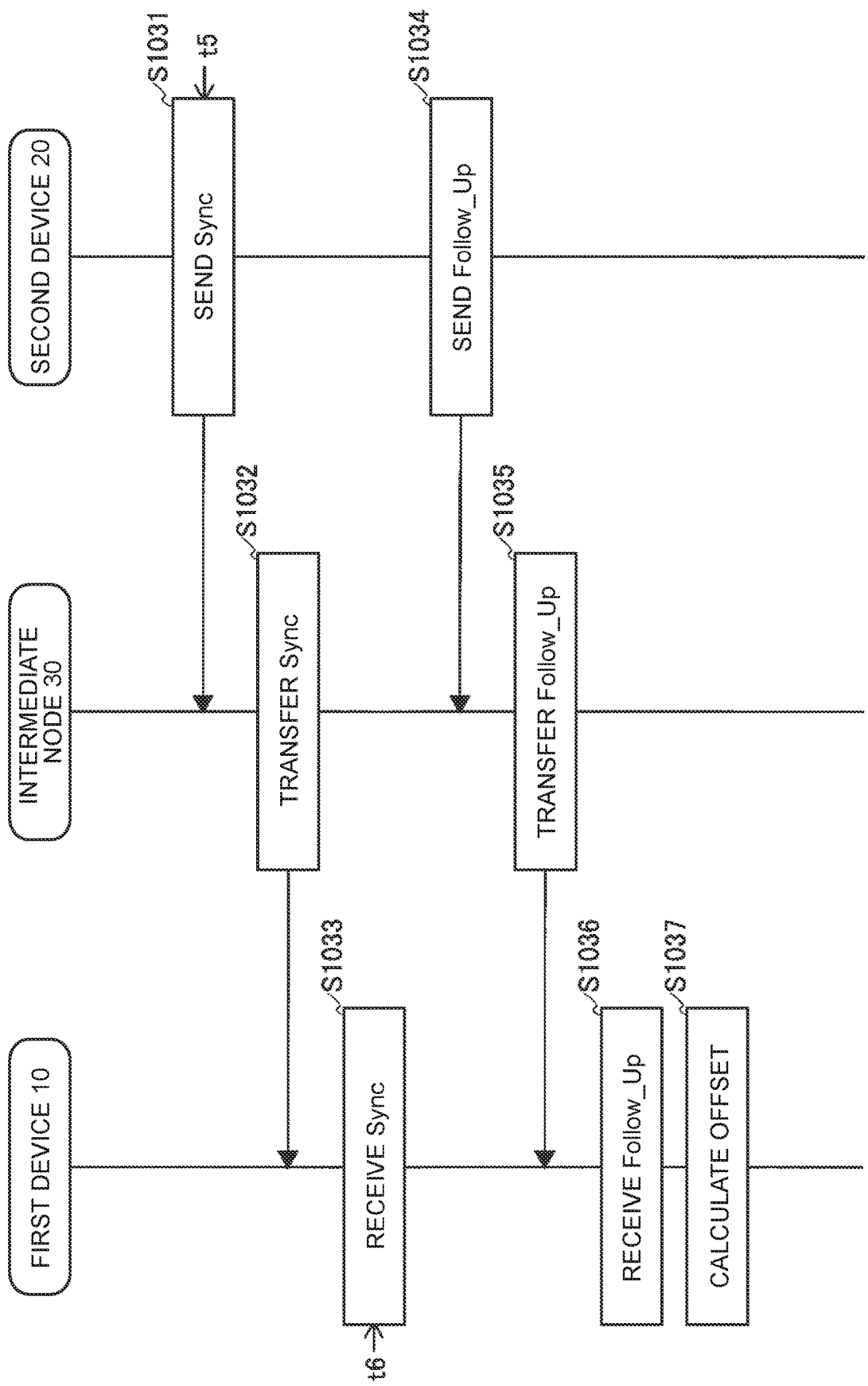
FIG. 4 is a sequence diagram that shows a process according to the embodiment of the disclosure.

The first control unit 13 of the first device 10 measures an offset between the first device 10 and the second device 20 by using communication through a message with the priority set in step S101 and the communication delay "delay" measured in step S102. An offset is a numeric value that represents the amount of advance of time that the first time management unit 11 of the first device 10 from time that the second time management unit 21 of the second device 20 manages. The details of this step will be described with reference to FIG. 4. FIG. 4 is a sequence diagram that illustrates the process of step S103 in detail. The process of step S103 is executed in compliance with IEEE1588 standard as an example.

Step S1031

The second control unit 23 of the second device 20 generates a Sync message with the same priority as the priority contained in the received Pdelay_Req message. The second communication unit 22 of the second device 20 sends the Sync message to the first device 10.

Step S1032

The Sync message is input to the intermediate node 30. The intermediate node 30 schedules the output timing of the Sync message based on the priority contained in the Sync message and transfers the Sync message to the first device 10 by outputting the Sync message in accordance with the scheduled output timing.

Step S1033

The first communication unit 12 of the first device 10 receives the Sync message. The first control unit 13 of the first device 10 stores time t6 at which the first device 10 has received the Sync message by referencing time that the first time management unit 11 manages.

Step S1034

The second control unit 23 of the second device 20 acquires the time t5 at which the second device 20 has sent the Sync message in step S1031, by referencing time that the second time management unit 21 manages. The second control unit 23 generates a Follow_Up message. The second communication unit 22 of the second device 20 sends the Follow_Up message to the first device 10. The Follow_Up message contains the time t5 at which the second device 20 has sent the Sync message.

Step S1035

The Follow_Up message is input to the intermediate node 30. The intermediate node 30 schedules the output timing of the Follow_Up message based on the priority contained in the Follow_Up message and transfers the Follow_Up message to the first device 10 by outputting the Follow_Up message in accordance with the scheduled output timing.

Step S1036

The first communication unit 12 of the first device 10 receives the Follow_Up message. The first control unit 13 stores the time t5 contained in the Follow_Up message.

Step S1037

The first control unit 13 of the first device 10 calculates an offset "offset" based on the time t5, the time t6, and the communication delay "delay" calculated in step S102 by using the following mathematical expression (2). The offset "offset" represents the degree of advance of time that the first time management unit 11 of the first device 10 manages from time that the second time management unit 21 of the second device 20 manages.

$$\text{offset}=(t6-t5)-\text{delay} \qquad (2)$$

A Sync message and a Follow_Up message each are a message that is periodically multicast with the associated priority, and the sequence of the process of step S102 and the processes of step S1031, step S1032, step S1033, step S1034, step S1035, and step S1036 of step S103 may be reversed.

Step S104

The first control unit 13 of the first device 10 determines whether there is any priority of a message whose communication delay and offset have not been measured of priorities to be used in the present embodiment. When there is an unmeasured priority, the process proceeds to step S105; whereas, when there is no unmeasured priority, the process proceeds to step S106.

Step S105

The first control unit 13 of the first device 10 selects the priority for which a communication delay and an offset have not been measured using a message, of the priorities to be used in the present embodiment and sets the priority as the priority of a message to be generated subsequently. Then, the process proceeds to step S102.

Step S106

The first control unit 13 of the first device 10 sets a delay representative value based on the communication delays respectively for priorities. A delay representative value is set so as to be typically a value less than a maximum value of the communication delays respectively for priorities. An example of a way of setting a value that is used as a delay representative value is shown.

(1) The first control unit 13 sets a minimum value of the communication delays respectively for priorities as a delay representative value. With this configuration, a value that is the smallest and relatively stable of measured values and whose distribution is expected to be small can be employed as a delay representative value.

(2) The first control unit 13 sets any one of communication delays respectively for priorities, other than the maximum value, as a delay representative value. With this configuration, a value that is relatively small and relatively stable of measured values and whose distribution is expected to be small can be employed as a delay representative value.

(3) The first control unit 13 sets an average of the communication delays respectively for priorities as a delay representative value. With this configuration, a value that is smaller than a maximum value of measured values through averaging and whose distribution is expected to be small can be employed as a delay representative value.

(4) The first control unit 13 sets any one of communication delays smaller than a communication delay for a predetermined priority, of communication delays respectively for priorities as a delay representative value. With this configuration, a value that is relatively small and relatively stable of measured values and whose distribution is expected to be small can be employed as a delay representative value. When the communication delay for the predetermined priority is a minimum value, the value is set as a delay representative value.

(5) The first control unit 13 sets in advance weights that increase as a priority becomes higher and sets a weighted average, using the weights, of the communication delays respectively for priorities as a delay representative value. With this configuration, as in the case of (3), a value that is smaller than a maximum value of measured values through averaging and whose distribution is expected to be small can be employed as a delay representative value. In addition, when a communication delay and its distribution in the case of a higher priority are smaller than those in the case of a lower priority like a general tendency, a value that is much smaller than that in the case of (3) and whose distribution is small can be employed.

(6) The first control unit 13 stores in advance communication delays respectively for priorities, measured at the time when the flowchart shown in FIG. 2 has been executed previously. The first control unit 13 sets in advance weights for each priority based on the predetermined number of the last communication delays stored for each priority such that the weights increase as the communication delays measured previously tend to reduce. For example, an average of a predetermined number of previous communication delays for each priority is taken, and the weights of a priority are increased as the average for the priority reduces. In this example, the first control unit 13 sets a weighted average, using the weights, of currently measured communication delays respectively for as a delay representative value. With this configuration, as in the case of (3), a value that is smaller than a maximum value of measured values through averaging and whose distribution is expected to be small can be employed as a delay representative value. In addition, a value that is less influenced by a communication delay for a priority for which a communication delay was previously long than that in the case of (3) can be employed.

Step S107

The first control unit 13 of the first device 10 finds an offset representative value commensurate with the delay representative value set in step S106. For example, when a measured value of a communication delay for any one of priorities is set as a delay representative value like (1), (2), or (4), the first control unit 13 sets an offset for the priority as an offset representative value. In other words, when a communication delay of a message with priority "7" is set as a delay representative value, an offset of the message with priority "7" is set as an offset representative value.

For example, when an average (or weighted average) of measured values of communication delays for a plurality of priorities is set as a delay representative value like (3), (5), or (6), the first control unit 13 sets an average (or weighted average) of offsets respectively for the priorities as an offset representative value. In other words, when an average of communication delays for priority "7" and priority "0" is set as a delay representative value, an average of offsets for priority "7" and priority "0" is set as an offset representative value.

Step S108

The first control unit 13 of the first device 10 adjusts time that the first time management unit 11 manages based on the offset representative value found in step S107 to synchronize the time with time that the second time management unit 21 of the second device 20 manages. For example, synchronization is performed by gradually subtracting the offset representative value from time that the first time management unit 11 manages.

Thus, the process ends. If measured communication delays respectively for priorities all are the same value and have no difference, the first control unit 13 just needs to, for example, set the value as a delay representative value and set any one of measured offsets or an average of measured offsets as an offset representative value.

In the above-described example, the first control unit 13 measures communication delays respectively for priorities and then measures offsets respectively for priorities. Alternatively, the first control unit 13 may set a delay representative value based on communication delays respectively for priorities and then measure only an offset for a priority required to find an offset representative value. For example, in the case where a delay representative value is set as in the case of (1), when a communication delay of a message with priority "7" is minimum, only an offset of the message with priority "7" just needs to be measured, and the measured value just needs to be set as an offset representative value.

Advantageous Effects

According to the disclosure, in a network system in which an intermediate node, such as a switching hub, uses a relative priority scheme, even when a distribution of communication delays of the highest priority message is not the smallest, but a communication delay representative value whose distribution is expected to be relatively small is set through communication using messages with multiple priorities, and an offset that is the amount of time adjustment for synchronization is found by using the communication delay representative value. Therefore, the accuracy of time synchronization is improved.

For example, when, in a current communication status of the network system 1, the average of communication delays of a message with priority "7" is 3 ms and the maximum is 5 ms and the average of communication delays of a message with priority "1" is 0.5 ms and the maximum is 10 ms, a smaller one of the communication delay for priority "7" and the communication delay for priority "1" is used as a delay representative value, the delay representative value has approximately an average of 0.5 ms and a maximum of 5 ms. Therefore, a distribution can be reduced.

The disclosure is not limited to a network system only and may be regarded as a device included in the network system, a time synchronization method that a computer of the device executes, a time synchronization program, a non-transitory computer-readable storage medium storing the time synchronization program, and a vehicle or the like including the network system. The disclosure is also applicable to a network system other than a network system that is provided in a vehicle.

The disclosure is useful for a network system that is provided in a vehicle, or the like.

What is claimed is:

1. An in-vehicle network system comprising:
a first device configured to manage a first time;
a second device configured to manage a second time and send or receive a message to or from the first device; and
an intermediate node connected between the first device and the second device, the intermediate node being configured to buffer input messages, the intermediate node being configured to output the buffered messages in a sequence determined by a relative priority scheme, the relative priority scheme being a scheme that does not guarantee that a first message whose priority is higher than a priority of a second message is always output earlier than the second message, and the first message and the second message being included in the buffered messages,
wherein the first device includes circuitry configured to:
communicate with the second device;
manage the first time;
measure a communication delay for each of a plurality of messages of different priorities to send or receive the plurality of messages to or from the second device;
set, based on a result of measuring the communication delays for each priority included in the different priorities, a delay representative value less than a maximum value of a plurality of the communication delays corresponding to each priority;
acquire the second time managed by the second device at which the second device has sent the message to the first device; and
adjust the first time managed by the circuitry of the first device based on the first time managed by the first device at which the first device has received the message, the second time managed by the second device at which the second device has sent the message, and the delay representative value.

2. The in-vehicle network system according to claim 1, wherein the delay representative value is a minimum value of the plurality of the communication delays.

3. The in-vehicle network system according to claim 1, wherein the delay representative value is any value other than a maximum value of the plurality of the communication delays.

4. The in-vehicle network system according to claim 1, wherein the delay representative value is an average of the plurality of the communication delays.

5. The in-vehicle network system according to claim 1, wherein the delay representative value is any communication delay shorter than or equal to a communication delay for a predetermined priority, of the plurality of the communication delays.

6. The in-vehicle network system according to claim 1, wherein the delay representative value is a weighted average of the plurality of the communication delays, using weights that increase as priority increases.

7. The in-vehicle network system according to claim 1, wherein:
the circuitry is further configured to set weights based on a plurality of previously measured communication delays such that weights of the communication delay for a third message are greater than weights of the communication delay for a fourth message where a previous measured communication delay of a message having the priority of the third message is smaller than a previous measured communication delay of a message having the priority of the fourth message; and
the delay representative value is a weighted average of a plurality of currently measured communication delays, using the weights of the communication delay for the third message and the weights of the communication delay for the fourth message.

8. A method applied to an in-vehicle network system, the in-vehicle network system comprising:
a first device configured to manage a first time;
a second device configured to manage a second time and send or receive a message to or from the first device; and
an intermediate node connected between the first device and the second device, the intermediate node being configured to buffer input messages, the intermediate node being configured to output the buffered messages in a sequence determined by a relative priority scheme, the relative priority scheme being a scheme that does not guarantee that a first message whose priority is higher than a priority of a second message is always output earlier than the second message, and the first message and the second message being included in the buffered messages, wherein the method comprises:

communicating with the second device via the first device;

managing the first time via the first device;

measuring, via the first device, a communication delay for each of a plurality of messages of different priorities to send or receive the plurality of messages to or from the second device;

setting, via the first device, based on a result of measuring the communication delays for each priority included in the different priorities, a delay representative value less than a maximum value of a plurality of the communication delays corresponding to each priority;

acquiring, via the first device, the second time managed by the second device at which the second device has sent the message to the first device; and adjusting, via the first device, the first time based on the first time managed by the first device at which the first device has received the message, the second time managed by the second device at which the second device has sent the message, and the delay representative value.

* * * * *